(12) United States Patent
Sodankur et al.

(10) Patent No.: US 9,156,713 B2
(45) Date of Patent: Oct. 13, 2015

(54) MANUALLY OPERATED CONTINUOUS FLOW TYPE DRINKING WATER DISINFECTOR USING CONCENTRATED SOLAR RADIATION

(75) Inventors: Rajan Thimmannabhat Sodankur, Bhavnagar (IN); Pushpito Kumar Ghosh, Bhavnagar (IN); Sanatkumar Natvarlal Patel, Bhavnagar (IN); Jitendrabhai Narsinbhai Bharadia, Bhavnagar (IN)

(73) Assignee: Council of Scientific & Industrial Research, New Delhi (IN)

( * ) Notice: Subject to any disclaimer, the term of this patent is extended or adjusted under 35 U.S.C. 154(b) by 879 days.

(21) Appl. No.: 13/260,383

(22) PCT Filed: Mar. 29, 2010

(86) PCT No.: PCT/IN2010/000323
§ 371 (c)(1),
(2), (4) Date: Oct. 31, 2011

(87) PCT Pub. No.: WO2010/119457
PCT Pub. Date: Oct. 21, 2010

(65) Prior Publication Data
US 2012/0118803 A1    May 17, 2012

(30) Foreign Application Priority Data
Mar. 27, 2009   (IN) .............................. 615/DEL/2009

(51) Int. Cl.
*C02F 1/14*    (2006.01)
*C02F 1/30*    (2006.01)
(Continued)

(52) U.S. Cl.
CPC ... *C02F 1/30* (2013.01); *C02F 1/14* (2013.01); *F24J 2/16* (2013.01); *F24J 2/52* (2013.01);
(Continued)

(58) Field of Classification Search
None
See application file for complete search history.

(56) References Cited

U.S. PATENT DOCUMENTS 1,193,143 A * 8/1916 Henri et al. .................. 250/437
1,302,363 A * 4/1919 Graham ......................... 122/26
(Continued)

FOREIGN PATENT DOCUMENTS

DE    9404428 A1    9/1994
DE    19714810 A1    10/1998
(Continued)

OTHER PUBLICATIONS

Marcene Robinson, Student's Solar-Powered Lens Purifies Polluted Water; UB Reporter—a Publication of the University at Buffalo The State University of New York, Aug. 14, 2014, two pages.*

*Primary Examiner* — Robert James Popovics
(74) *Attorney, Agent, or Firm* — Luedeka Neely Group, PC (57) ABSTRACT

The present invention of manually operated continuous flow type concentrated solar drinking water disinfector improves the effectiveness and productivity of disinfection of drinking water for individual families or small communities, without using conventional fossil fuel derived heat or electricity or solar photovoltaic electricity, by clarifying the feed water with alum, aerating it manually, preheating it in solar water preheater and then while flowing as a thin stream exposing it directly to solar radiation without an intervening glass or plastic container material, with solar radiation incident on top side of pre-heater section and on top side of solar UV section intensified with mirrors and while the disinfector unit which is mounted on a trolley, is manually oriented towards the sun intermittently.

9 Claims, 6 Drawing Sheets

(51) Int. Cl.
*F24J 2/52* (2006.01)
*F24J 2/16* (2006.01)
*C02F 1/00* (2006.01)
*C02F 1/32* (2006.01)

(52) U.S. Cl.
CPC ............ *C02F 1/32* (2013.01); *C02F 2001/007* (2013.01); *C02F 2201/008* (2013.01); *C02F 2209/003* (2013.01); *C02F 2209/02* (2013.01); *C02F 2303/04* (2013.01); *Y02E 10/47* (2013.01)

(56) References Cited

U.S. PATENT DOCUMENTS

| | | | | |
|---|---|---|---|---|
| 1,473,095 A * | 11/1923 | Henri et al. | | 250/437 |
| 2,141,330 A * | 12/1938 | Abbot | | 202/180 |
| 2,412,466 A * | 12/1946 | Miller, Jr. | | 202/234 |
| 2,413,101 A * | 12/1946 | Delano | | 202/234 |
| 2,427,262 A * | 9/1947 | Delano | | 202/185.3 |
| 2,445,350 A * | 7/1948 | Ginnings | | 202/172 |
| 2,455,834 A * | 12/1948 | Ushakoff | | 202/234 |
| 2,455,835 A * | 12/1948 | Ushakoff | | 202/234 |
| 2,490,659 A * | 12/1949 | Snyder | | 202/205 |
| 2,788,316 A * | 4/1957 | Bjorksten | | 202/234 |
| 2,807,912 A * | 10/1957 | Bjorksten | | 47/58.1 R |
| 2,813,063 A * | 11/1957 | Bjorksten | | 47/81 |
| 2,820,744 A * | 1/1958 | Lighter | | 202/234 |
| 2,843,536 A * | 7/1958 | Mount | | 202/234 |
| 3,006,818 A * | 10/1961 | Lappala et al. | | 202/234 |
| 3,088,882 A * | 5/1963 | Justice | | 202/205 |
| 3,104,210 A * | 9/1963 | Mount | | 202/234 |
| 3,159,554 A * | 12/1964 | Mount | | 202/234 |
| 3,174,915 A * | 3/1965 | Edlin | | 202/234 |
| 3,193,473 A * | 7/1965 | Beard | | 202/234 |
| 3,290,230 A * | 12/1966 | Kobayashi | | 202/234 |
| 3,337,418 A * | 8/1967 | Halacy, Jr. | | 202/83 |
| 3,357,898 A * | 12/1967 | Novakovich | | 202/234 |
| 3,359,183 A * | 12/1967 | Kenk | | 202/190 |
| 3,367,843 A * | 2/1968 | Clive et al. | | 202/176 |
| 3,394,054 A * | 7/1968 | Hoham | | 202/177 |
| 3,397,117 A * | 8/1968 | Smith et al. | | 202/234 |
| 3,407,122 A * | 10/1968 | Dickinson, III | | 202/83 |
| 3,415,719 A * | 12/1968 | Telkes | | 202/83 |
| 3,468,762 A * | 9/1969 | Klitzsch | | 202/186 |
| 3,501,381 A * | 3/1970 | Delano | | 202/83 |
| 3,655,517 A * | 4/1972 | Hensley et al. | | 202/234 |
| 3,880,719 A * | 4/1975 | Massie | | 202/234 |
| 4,107,000 A * | 8/1978 | Currin | | 202/188 |
| 4,141,798 A * | 2/1979 | Grosse | | 202/234 |
| 4,151,046 A * | 4/1979 | Eidelberg | | 202/180 |
| 4,153,955 A * | 5/1979 | Hinterberger | | 4/493 |
| 4,168,696 A * | 9/1979 | Kelly | | 126/683 |
| 4,209,363 A * | 6/1980 | Ramer | | 202/180 |
| 4,219,387 A * | 8/1980 | Gruntman | | 202/182 |
| 4,230,531 A * | 10/1980 | Fernandopulle | | 202/180 |
| 4,235,679 A * | 11/1980 | Swaidan | | 202/234 |
| 4,253,271 A * | 3/1981 | Raymond | | 47/1.4 |
| 4,261,329 A * | 4/1981 | Walsh et al. | | 126/569 |
| 4,312,709 A * | 1/1982 | Stark et al. | | 202/83 |
| 4,344,824 A * | 8/1982 | Soleau, Jr. | | 202/234 |
| 4,371,623 A * | 2/1983 | Taylor | | 435/300.1 |
| 4,420,375 A * | 12/1983 | Husson | | 202/234 |
| 4,606,794 A * | 8/1986 | Wyckoff | | 202/173 |
| 4,613,409 A * | 9/1986 | Volland | | 203/10 |
| 4,639,293 A * | 1/1987 | Lew | | 202/205 |
| 4,749,447 A * | 6/1988 | Lew | | 202/177 |
| 4,769,131 A * | 9/1988 | Noll et al. | | 210/85 |
| 4,966,655 A * | 10/1990 | Wilkerson, Jr. | | 202/234 |
| 4,978,458 A | 12/1990 | Inagaki | | |
| 5,019,256 A * | 5/1991 | Ifill et al. | | 210/232 |
| 5,158,650 A * | 10/1992 | Wilkerson | | 202/234 |
| 5,302,356 A * | 4/1994 | Shadman et al. | | 422/186.3 |
| 5,391,262 A * | 2/1995 | Wilkerson, Jr. | | 203/10 |
| 5,413,768 A * | 5/1995 | Stanley, Jr. | | 422/186.3 |
| 5,449,466 A * | 9/1995 | Peebles, III et al. | | 210/748.14 |
| 5,598,661 A * | 2/1997 | Eiderman et al. | | 47/48.5 |
| D432,203 S * | 10/2000 | Edwards | | D23/207 |
| 6,419,821 B1 * | 7/2002 | Gadgil et al. | | 210/86 |
| 6,440,275 B1 * | 8/2002 | Domen | | 202/234 |
| 6,464,884 B1 * | 10/2002 | Gadgil | | 210/748.11 |
| 6,602,425 B2 * | 8/2003 | Drescher et al. | | 210/744 |
| 6,773,608 B1 * | 8/2004 | Hallett et al. | | 210/748.11 |
| 6,803,587 B2 * | 10/2004 | Gadgil et al. | | 250/434 |
| 6,821,395 B1 * | 11/2004 | Ward | | 203/10 |
| 6,974,958 B2 * | 12/2005 | Gadgil et al. | | 250/434 |
| 7,217,933 B2 * | 5/2007 | Gadgil et al. | | 250/423 R |
| 7,438,799 B2 * | 10/2008 | Vandenbelt et al. | | 210/85 |
| D590,202 S * | 4/2009 | Gadgil et al. | | D7/339 |
| 7,669,592 B2 * | 3/2010 | Polk | | 126/643 |
| 7,837,865 B2 * | 11/2010 | Wadstrom | | 210/85 |
| 8,142,652 B2 * | 3/2012 | Wadstrom | | 210/175 |
| 8,613,840 B1 * | 12/2013 | Alayoub | | 202/234 |
| 2002/0112949 A1 * | 8/2002 | Cho et al. | | 203/10 |
| 2002/0113022 A1 * | 8/2002 | Gadgil et al. | | 210/748 |
| 2002/0117631 A1 * | 8/2002 | Gadgil et al. | | 250/434 |
| 2002/0139656 A1 * | 10/2002 | Reid | | 203/1 |
| 2004/0195083 A1 * | 10/2004 | Ward | | 202/234 |
| 2005/0092931 A1 * | 5/2005 | Gadgil et al. | | 250/434 |
| 2005/0269254 A1 * | 12/2005 | Roitman | | 210/252 |
| 2006/0192136 A1 * | 8/2006 | Gadgil et al. | | 250/432 R |
| 2009/0277769 A1 * | 11/2009 | Nichols | | 202/234 |
| 2011/0139601 A1 * | 6/2011 | Johnstone | | 202/180 |
| 2012/0118803 A1 * | 5/2012 | Sodankur et al. | | 210/175 |
| 2012/0285815 A1 * | 11/2012 | Johnstone | | 202/267.1 |
| 2012/0325644 A1 * | 12/2012 | Ben Dor et al. | | 203/10 |

FOREIGN PATENT DOCUMENTS

| | | | | |
|---|---|---|---|---|
| WO | WO 9805367 A1 * | 2/1998 | | A61L 2/10 |
| WO | 0030981 A1 | 6/2000 | | |

* cited by examiner

MANUALLY OPERATED CONTINUOUS FLOW TYPE DRINKING WATER DISINFECTOR USING CONCENTRATED SOLAR RADIATION

FIELD OF INVENTION

The present invention relates to a manually operated continuous flow type drinking water disinfector using concentrated solar radiation. More specifically, the invention relates to a domestic scale manually operated drinking water disinfector that utilizes intensified solar radiation to achieve log 3 reduction in microbial count under continuous flow mode.

BACKGROUND OF THE INVENTION

Conventional methods used for disinfection of unpotable water include boiling, filtration, chlorination, ozonation, and ultra violet (UV) treatment. For remote locations, any method of treatment that can utilize solar energy is highly desirable; even more so as it is eco-friendly, sustainable and involves no hazards of any kind.

It is known, that UV part of solar radiation kills and de-activates pathogens in water in the wavelength range 400 nm to 100 nm of UV, and that disinfection of drinking water through de-activation by UV depends on the UV dosage which is proportional to the product of sunshine intensity and water exposure time. One known possible way of intensifying the intensity of solar UV radiation is to use mirrors which reflect to re-direct additional solar radiation to the water treatment chamber. In the case of silver coated glass mirrors, the reflectivity is higher if the iron content of the glass is lower and also if the mirror is thinner. Commercial float glass mirrors with second surface (backside) silver coating are known to have optical reflectivity in the range of 85%-90%. Low iron float glass mirrors are known to have a little higher optical reflectivity in the range of 90%-93%. Polished flat metal mirrors over coated with dielectric layers are available commercially to increase reflection in the entire range of solar spectrum or in a given interval of solar spectrum. For example, aluminum over-coated with quartz is the most commonly used metal for higher mirror reflectivity for the UV, visible and infra red parts of spectrum and aluminum over coated with magnesium fluoride ($MgF_2$) is used for high reflection efficiency of about 96% for the UV range (200 nm to 400 nm) of solar spectrum (for example refer www.hilltech.com/products/uv_components/UV_reflectors.html, www.mellesgriot.com/products/optics/oc_5_1.htm, www.industrial-paints.globalspec.com/FeaturedProducts/Detail/JMLOpticalIndustries/Reflective_Coatings_for_Efficient_Mirrors/27933/0 www.edmundoptics.com/techSupport/DisplayArticle.cfm?articleid=269, www.optarius.com/uv_enhanced_aluminum_mirrors.htm all as on 31/08/08, and Raghunath et al., 2008 Journal of Physics: Conference Series 114)

Reference may be made to the use of solar water heater for disinfection by pasteurization. Commercial solar pasteurizers heat water to a temperature of 79.4 degree C. but such heating leads to relatively less productivity. For example, one commercial solar pasteurizer produces about 30 liters on a sunny day and to avoid scaling in the pasteurizer it needs softening pre-treatment of feed water if it is hard.

Reference may be made to the patent number: NL1023450-C2, Derwent Primary Accession Number: 2005-097533 [11], titled "Stand alone water disinfection unit, contains UV reactor on fluid connection between water storage tank and outlet" by Koehorst Amto, whose drawback is the need for a ultraviolet reactor powered by electricity derived from solar energy using solar photovoltaic cells which are relatively more expensive. In effect, the above cited invention is mainly about substituting grid-supplied electrical power with solar-generated electrical power to provide UV radiation and not the direct use of UV radiation already available in solar spectrum, for disinfection.

Another solar disinfection method is SODIS (Solar Disinfection) which was developed by the Swiss Federal Institute for Environmental Science and Technology (EAWAG). This method uses plastic (PET or PVC) bottles to fill raw water and expose to solar radiation from one hour to two days depending upon the available intensity of sun shine. The main limitations of SODIS is that effective penetration of solar radiation depends on the clarity of the bottle material and of the contained water; solar radiation can sometimes be rather diffused and may not lead to effective knock out of pathogens, and the path length of solar radiation inside water-filled bottle is too long for uniform penetration to all parts. Another yet uninvestigated possibility is re-activation of de-activated pathogens in the warm water under diffused sunshine or overnight. Other risks include infection by the use of unclean bottles and leaching of toxic substances from plastic material of bottles into the water.

Reference may be made to the publication by Acra, A, et al (1980), "Disinfection of Oral Rehydration Solutions by Sunlight", The Lancet 2:1257-1258, Acra, A., et al., (1990) which mentions experiments on solar disinfection of oral rehydration solution placed in polyethylene bags placed in sunlight for two hours. Even though the effectiveness of UV treatment and also the throughput would be higher at higher intensities, no reference is made either to use of concentrated solar radiation or to the direct exposure of the feed water to the radiation. Further, polyethylene bags degrade with prolonged exposure to solar radiation and due to scratches caused by repeated handling, resulting in less penetration of solar radiation.

Another reference may be made to the publication "Solar water disinfection", Proceedings of a workshop held at Brace Rice research Institute, Montreal, Canada, 15-17 Aug. 1988, edited by T. A. Lawand et al., which covers extensively different methods of solar water disinfection, their advantages and disadvantages. The main drawbacks in all these processes are either limited productivity of treated water or use of materials such as plastics or glass that reduce transmission of solar ultraviolet radiation to water or deteriorate due to their continued exposure to solar ultraviolet radiation. There is also no reference to the use of concentrated solar radiation.

Yet another reference may be made to the paper by Laurie F. Caslake et al., titled "Disinfection of contaminated water by using solar irradiation", in Applied and environmental microbiology, February, 2004, p 1145-1150 which describes a method of solar disinfection of drinking water by a continuous flow method by using a grooved polyvinyl chloride plate for continuous flow of water which was covered permanently by an acrylic plate which is transparent to ultraviolet radiation. Besides the fact, that acrylic plates are vulnerable to scratches and can deteriorate due to prolonged exposure to solar ultraviolet radiation, no reference is made either to use of concentrated solar radiation or to the direct exposure of the feed water to the solar radiation.

OBJECTS OF THE INVENTION

The main object of the invention is to provide a simple manually operated continuous flow type disinfector for disinfection of drinking water with concentrated solar radiation.

Another object is to concentrate the solar radiation by 2 to 3 times the normal intensity using mirrors to improve the effectiveness and productivity of disinfection.

Another object is to irradiate the water directly without any intervening medium.

Another object is to preheat the feed water with solar energy prior to UV irradiation to improve the effectiveness of disinfection.

Another object is to clarify the water to maximize the effectiveness of the incident radiation.

Another object is to aerate the clarified feed water for maximum effectiveness of solar disinfection.

Another object is to devise a unit which can produce 150-200 liters of water per day so as to cater to drinking water needs of small communities or small village schools or hospitals.

Another object is to use a low enough temperature for disinfection which will not cause scaling as it happens during disinfection by boiling when hard feed water is used.

Another object is to set aside an appropriate part of the treated water each day during sunny days for collection and storage in a hygienic covered tank to take care of drinking water needs during monsoon season when there are many cloudy days and solar disinfection is less effective.

DRAWINGS

In the drawings accompanying this specification

FIGS. 1-16 provide drawings of the above specifications.

SUMMARY OF THE INVENTION

The present invention provides a simple manually operated domestic size drinking water disinfector using concentrated solar radiation which does not require any heat derived from conventional fuel or electricity or solar photovoltaic electricity. Operating the present invention for about two hours on a sunny day can meet the daily average needs of a family of four members for drinking water or by operating solar disinfector for a longer time in a day enough disinfected water can be generated to meet the drinking water needs of larger families or small communities or field workers in remote or rural areas which may not have or afford the cost of conventional drinking water treatment plants driven by grid supplied electricity.

Accordingly, the present invention provides a manually operated continuous flow drinking water disinfector using solar radiation comprising:

A manually operated continuous flow drinking water disinfector using solar radiation comprising:
  i. a slant solar pre-heating chamber (6) with side and bottom thermal insulation;
  ii. a water heating coil being placed inside the slant solar pre-heating chamber (6), said water heating coil being covered by a doubly hinged and doubly glazed window;
  iii. a skirt (18) nailed or screwed onto the frame of the doubly hinged and doubly glazed window;
  iv. a fiber reinforced board or glass plate with multiple parallel etched grooves (19) attached near the skirt to be used as a disinfector section (4) for the flow of water stream;
  v. perforated feed water tube (22) being present above the top end of the grooved glass plate or board;
  vi. an output channel (20) near the water preheating chamber (6) made of an aluminum angle (20), the output channel being provided at the lower end of the multiply grooved plate or board, to collect disinfected drinking water;
  vii. at least two appropriately inclined mirrors fixed on left and right sides of said water preheating chamber (6), which are used for reflecting solar radiation onto the slant water pre-heater (6); and
  viii. at least two appropriately inclined mirrors on left and right sides of the water stream flow in the disinfector section (4) and one appropriately inclined mirror with a prop (7) at the feed water tube side (22), all of which are used for reflecting solar radiation onto the grooved plate or board.

In an embodiment of the present invention, the whole unit is mounted on a trolley (2) with four swiveling type cast iron wheels for orienting the whole unit manually towards the sun.

Figure 2:
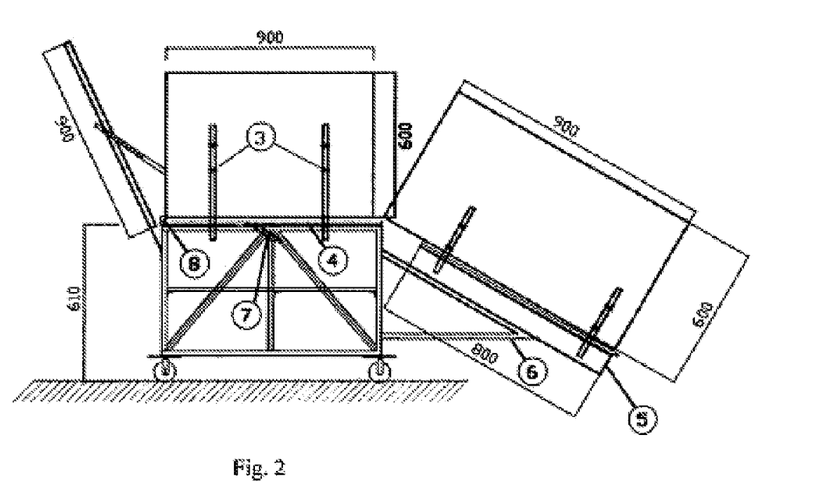
FIG. 2 represents side view of the full assembly of solar disinfector comprising of an inclined solar water pre-heater section and a horizontal solar UV disinfector section both of which have mirrors fitted on their sides.

In another embodiment of the present invention, the pre-heating chamber is positioned at a slant as shown in FIG. 2.

Figure 1:
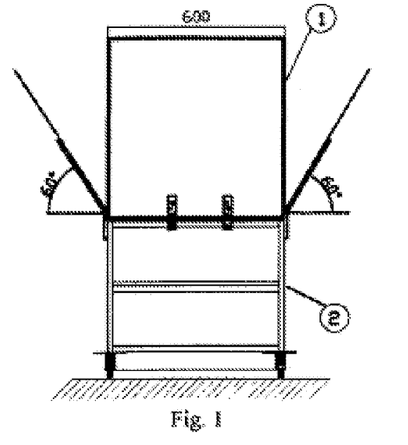
FIG. 1 represents the front view of the full assembly of manually operated continuous flow type drinking water disinfector using concentrated solar radiation.

In another embodiment of the present invention, at least two appropriately inclined mirrors [FIG. 1] are fitted on left and right sides of the said water preheating chamber at an angle of 60° as measured from the plane of the double glazed window of the preheater and wherein the mirrors used are float glass mirrors having silver coating or aluminum deposit on their rear side as reflective film or polished and appropriately protective coated aluminum mirrors.

In another embodiment of the present invention, at least two appropriately inclined mirrors are fitted on left and right sides of water stream flow in the disinfector section at an angle of 60° as measured from the plane of the said grooved plate or board and wherein the mirrors used are float glass mirrors having silver coating or aluminum deposit on their rear side as reflective film or polished and appropriately protective coated aluminum mirrors.

In another embodiment of the present invention, the pre-heating chamber is having an inner lining of black painted aluminum or galvanized iron sheet for solar energy absorption.

Figure 9:
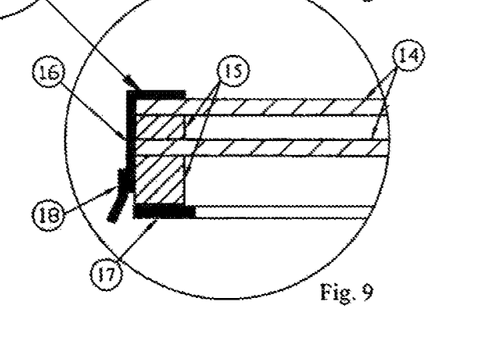
FIG. 9 represents the enlarged view of one end of the sectional view of the double-glazed window shown in FIG. 6.

In another embodiment of the present invention, the edges of double hinged double glazed window are lined with stitched thick cotton fabric tape [FIG. 9(17)] serving as air seals to retain hot air inside.

In another embodiment of the present invention, the skirt [FIG. 9(18)], nailed or screwed onto the window frame, is made of a tape of stitched thick cotton fabric glued and serves as a secondary air seal for the hot air generated in the water pre-heating chamber.

In another embodiment of the present invention, the parallel multiple grooved glass plate or fiber reinforced board is slightly sloping towards the pre-heater side to facilitate flow of feed water as a thin stream for intensified solar UV exposure for disinfection.

Figures 11, 12, 13, 14:
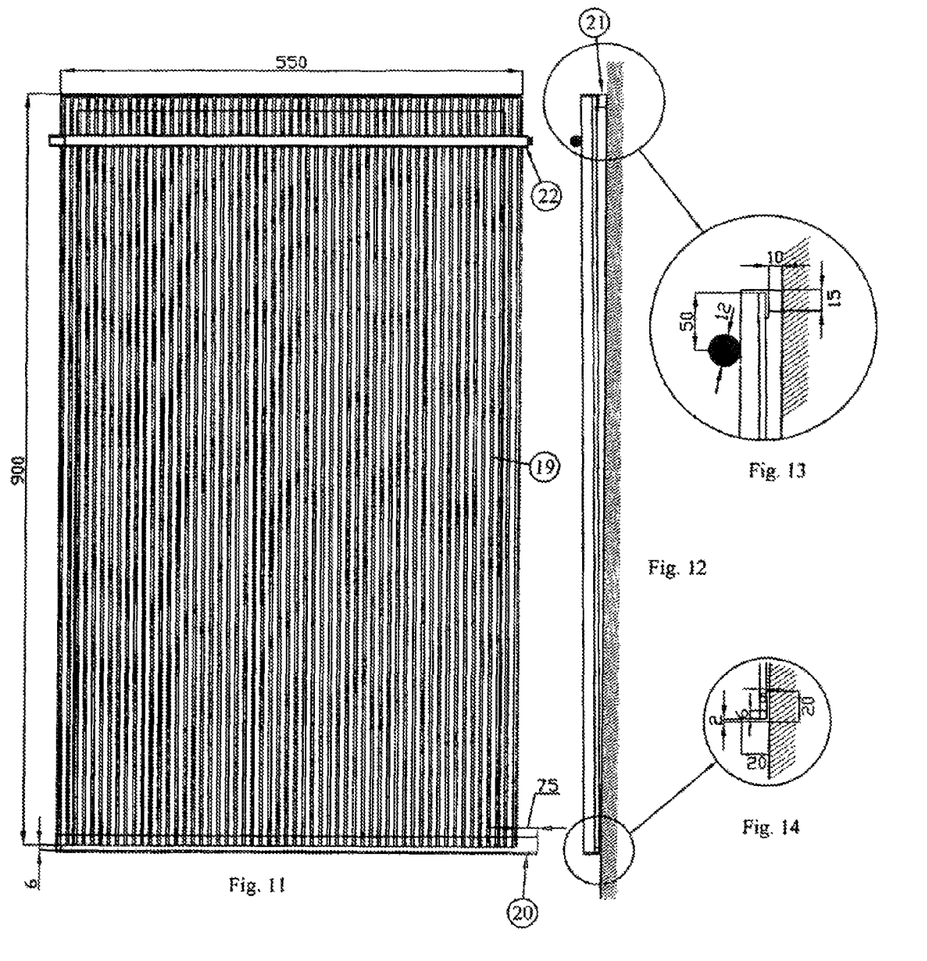
FIG. 11 represents the plan view of the grooved glass plate used in the disinfector.
FIG. 12 represents sectional view of the grooved glass plate shown in FIG. 11.
FIG. 13 shows the enlarged view of the feeder tube side of the sectional view of the grooved glass plate shown in FIG. 11.
FIG. 14 represents the enlarged view of collector channel side of the sectional view of the grooved glass plate shown in FIG. 11.

In another embodiment of the present invention, one mirror on the feeder tube [FIG. 11(22)] side is placed with a prop (7) so that its inclination can be varied to suit the inclination of the sun at different times of the day.

In another embodiment of the present invention, the pre-heating chamber is thermally insulated with cotton wool or glass wool or dry saw dust on the sides and at the bottom.

Figure 10:
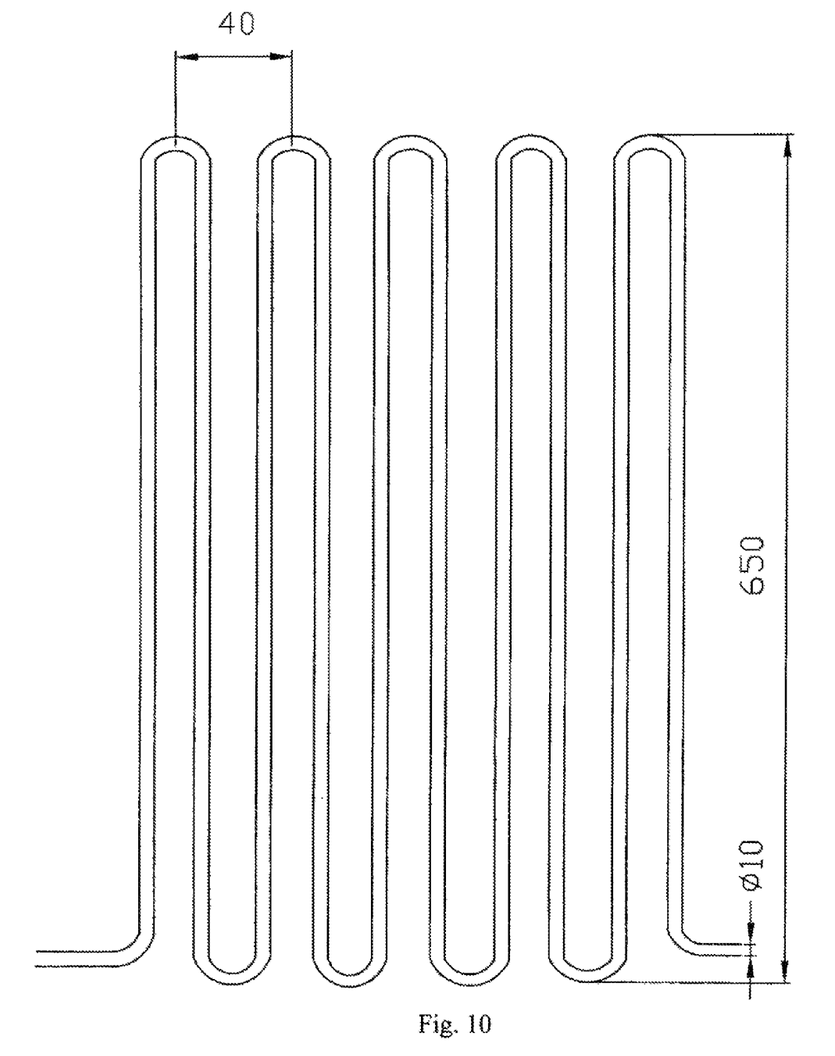
FIG. 10 represents the plan view of water pre-heating coil used in the disinfector.

In another embodiment of the present invention a water pre-heating coil of stainless steel or copper is placed on the black absorber sheet as shown in FIG. 10 to pre-heat water before flowing to disinfection section.

In another embodiment of the present invention, the pre-heating chamber is closed on the top by a double hinged double glazed window to trap the solar radiation and raise the chamber temperature as shown in FIGS. 6-9 and which works like a conventional domestic solar water heater.

In another embodiment of the present invention a parallel multiple grooved glass plate or grooved fiber reinforced plastic board is set with a slight slope towards the water preheater and has a perforated feed water tube over the raised end of the grooved plate or board and a collector channel at the lower end near the water preheating chamber to facilitate flow of water and as a thin stream from feeder end to collector end as shown in FIG. 11.

In another embodiment of the present invention the mirrors that direct radiation onto the grooved glass plate have high UV reflectivity, such as aluminum coated float glass mirror or polished aluminum over coated with appropriate dielectric material, for maximum effectiveness of radiation for disinfection.

In a further embodiment of the present invention the entire unit is mounted on four swivel-type castor wheels for easy manual orientation of the unit such that the water preheating chamber faces the sun.

DETAILED DESCRIPTION OF THE INVENTION

The construction of the continuous flow drinking water disinfector with its parts numbered from (1) to (22) is as shown in Figures numbered from 1 to 16 laid out in sheets numbered from 01 to 06.

As shown in its front view in FIG. 1, the assembly of the continuous flow drinking water disinfector using solar radiation has float glass mirrors (1) on a trolley frame (2). Two such mirrors (1) are placed on both the sides of pre-heater section (5) with their planes at a fixed inclination of 60 deg to the plane of the top side of pre-heater section (5) and with the longer sides of mirrors (1) meeting the longer sides of the pre-heater section (5). This enables the overlapping of mirror reflected solar images on the top side of pre-heater section (5) most of the time when the whole unit is turned to face the sun. Similarly two mirrors are fitted on both sides of the disinfector section (4) with their planes at a fixed inclination of 60 deg to the plane of the top side of disinfector section (4) and with the longer sides of mirrors meeting the longer sides of the disinfector section (4). This enables the overlapping of mirrors reflected solar images on the top side of disinfector section (4) most of the time when the whole unit is turned to face the sun.

Figure 15:
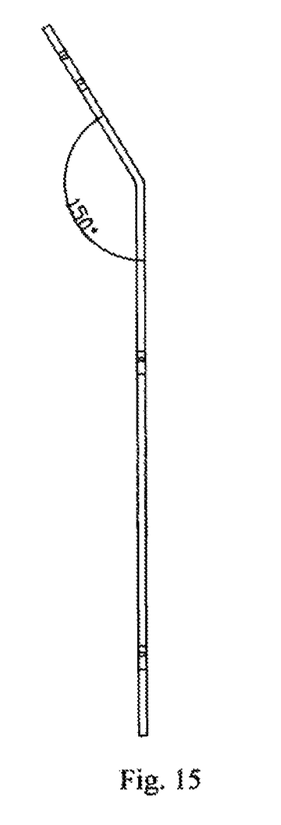
FIG. 15 represents the end view of one of the identical pair of supports used for each of the side mirrors shown in FIG. 3.
Figure 16:
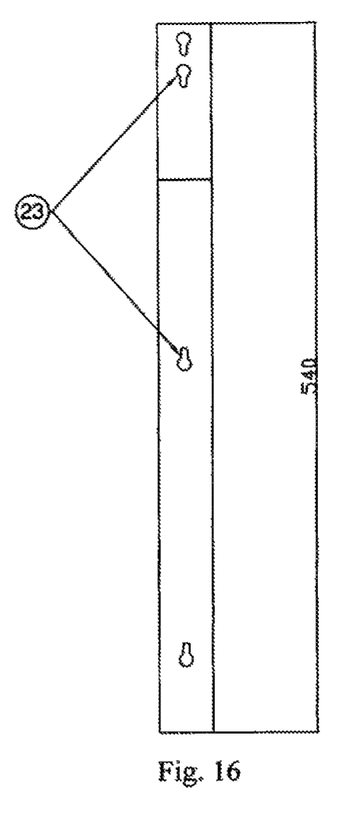
FIG. 16 represents the front view of the support for mirror shown in FIG. 15.

FIG. 2 shows the side view of the full assembly of the solar water disinfector. The float glass mirrors (1) on the sides are supported by bent supports of either mild steel flats (3) or bent angles of mild steel or aluminum whose end view is shown in FIG. 15 and front view is shown in FIG. 16. These supports (3) have four key holes (23) oriented at different positions for sliding each of the mirror supports (3) easily on to two bolts fixed to the trolley frame (2) and for mounting each of the mirrors (1) with two pairs of screws attached to their back plates by sliding them onto the supports. Further, one such mirror is fitted at feed water inlet end (8) of the direct solar water disinfector (4) with its shorter side meeting the shorter side of the disinfector and whose inclination can be varied using an attached prop (7) which is pivoted on the mirror's frame, and by resting one of its multiple notches at lower end on a fixed bolt attached to the trolley frame (2). This enables the mirror reflected solar image to overlap on the top side of the disinfector (4) most of the time when the whole unit is turned to face the sun. All the mirrors intensify the solar radiation incident on the top side of water pre-heater section (5) or on the top side of solar UV disinfector section. The water preheating chamber (6) of the slant solar water pre-heater section (5) has also been illustrated in FIG. 2.

Figure 3:
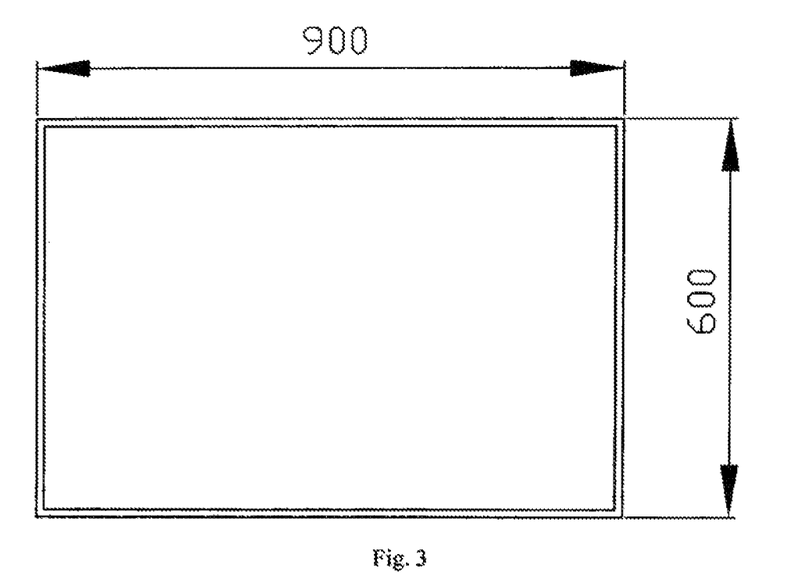
FIG. 3 represents the plan view of one of five identical mirrors used in the solar disinfector.
Figure 4:
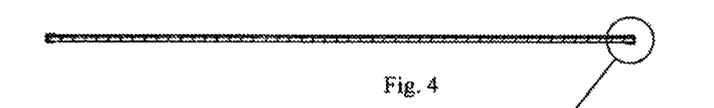
FIG. 4 represents the sectional view of the mirror shown in FIG. 3.
Figure 5:
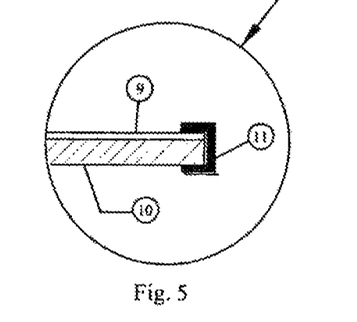
FIG. 5 represents the enlarged view of one end of the sectional view of the mirror shown in FIG. 3.

All the mirrors are of identical size as shown in plan view in FIG. 3 and as shown in sectioned end view in FIG. 4 with one end of the sectional view shown enlarged in FIG. 5.

The float glass mirror (9) with a backing plate of waterproof plywood sheet (10) is held by a frame of aluminum channel (11). The mirror edges are sealed with epoxy resin or paint to prevent intrusion of air or moisture and thereby avoiding eventual corrosion of the reflective silver coating of mirrors.

Figure 6:
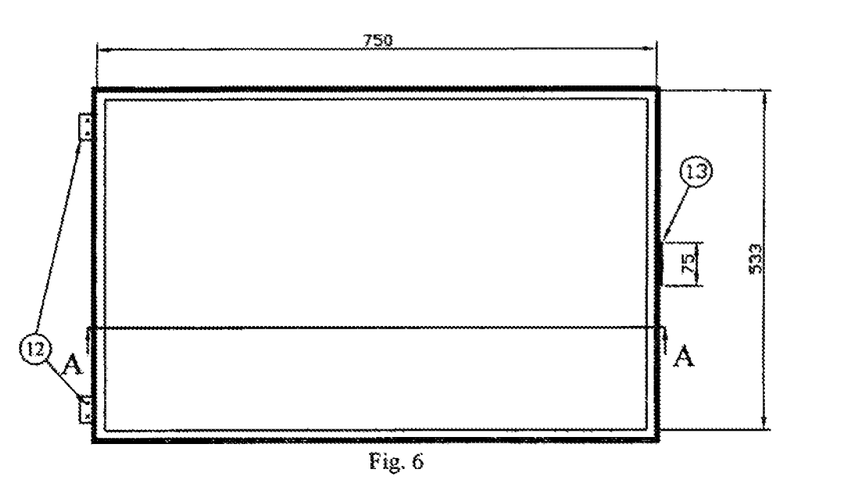
FIG. 6 represents the plan view of the double-glazed window of the slant water pre-heating chamber of the disinfector.
Figure 7:
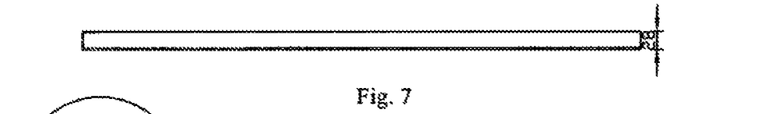
FIG. 7 represents the end view of the double-glazed window shown in FIG. 6.
Figure 8:
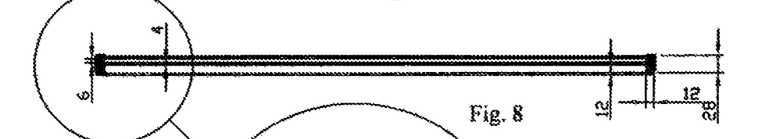
FIG. 8 represents the sectional view of the double-glazed window shown in FIG. 6.

The water preheating chamber (6) is covered by a doubly hinged (12) window with a lifting lug (13) made out of a piece of aluminum angle screwed to another side of the window frame whose plan view is shown in FIG. 6 and whose end view is shown in FIG. 7. The sectional view of the window is shown in FIG. 8. The enlarged view of one end of the sectional view of the window is shown in FIG. 9. The window has double glazing means (14) which are spaced by wooden strips (15) and held by frame of aluminum angle (16). The glass window has a tape (17) made of three or four times folded and stitched thick cotton fabric glued onto the bottom of the window frame to serve as air tight seals while the window closes on the water preheating chamber (6). The window frame is further provided with a skirt (18) out of a tape of thick stitched cotton fabric which is glued and nailed onto the sides of the window frame to provide a secondary sealing for hot air generated in the water preheating chamber (6). This secondary air seal also covers and compensates for any gap caused by any misalignment in shaping or fitting of window frame.

A water-heating coil made out of stainless steel or copper tube of 10 mm nominal diameter as shown in FIG. 10 is placed inside the water preheating chamber (6) which has two holes for inserting flexible external plastic tubing to connect with the two ends of the heating coil kept inside.

A glass plate with multiple parallel etched grooves (19) as shown in FIG. 11 or a fiber reinforced plastic board with similar grooves has, at its lower end, a piece of aluminum angle (20) attached with epoxy resin to the glass plate or fiber reinforced board such that one end of the angle is closed with a wooden strip and the other end protrudes a little beyond the width of the glass plate or fiber reinforced plastic board to serve as a collector of the disinfected water flowing over the grooved glass plate or fiber reinforced board and for draining the same into a water can. The grooved plate or board has a wooden strip (21) attached at the bottom so as to rest the grooved plate or board on the trolley frame with a slight slope towards the collector angle side. On the upper end of the grooved glass plate or fiber reinforced board, is a water feeder pipe (22) of polyvinyl chloride with fine multiple holes of 1 mm diameter drilled into them at equal intervals matching the spacing of the grooves on the plate or board and has one of its end plugged. When the solar disinfector unit is properly oriented towards the sun, solar radiation reflected by the left and right side booster mirrors and the front side mirror add to the normal radiation incident on the water streaming down the grooved plate or board to increase the intensity of solar radiation incident on the water stream by three times of normal intensity, thereby intensifying the ultraviolet radiation incident on the water stream proportionately. Similarly, solar radiation reflected by the left and right side booster mirrors add to the normal radiation incident on the double glazed window of the solar water preheater to make up the intensity of solar radiation incident on the double glazed window to maximum value of two for faster heating of water.

This invention makes use of known ability of ultra violet radiation to destroy or deactivate pathogens thereby disinfecting water. The present invention improves the effectiveness and rate of disinfection by concentrating solar radiation using UV-reflective booster mirrors, thereby intensifying the ultraviolet radiation by the additional reflected radiation from mirrors on three sides, when the disinfector unit is oriented properly towards the sun. The effect is further enhanced by aerating the feed water manually and preheating the water to a temperature which is much lower than that required for pasteurization but slightly above the normal temperature of the human body. The novelty of the invention is that for more effective and more productive disinfection, it facilitates direct exposure of water to be disinfected, to solar UV radiation without the intervening water container wall of plastics or glass which may reduce UV penetration, and also facilitates reduction in the depth of the water mass exposed to solar UV radiation by trickling water to flow as thin stream. The inventive features of the present device is the set up which enables intensification of solar UV radiation with the addition of solar radiation reflected from mirrors for irradiating water directly without intervening medium of glass or plastics and flow of water as a thin stream. An additional inventive measure is improving the certainty of disinfection of drinking water by the combination of aeration, pre-heating, and direct exposure to intensive solar UV radiation all of which individually are known to destroy or de-activate different pathogens but collectively lead to tackling a wider spectrum of pathogens in water through a combination of chemical, thermal and radiation means.

WORKING OF THE PRESENT INVENTION

For using the continuous flow solar disinfector raw feed water whose chemical quality is found to be fit for drinking, but requires to be decontaminated from pathogens is first treated with alum for making the water clear by settling the suspended solids if there is any, as water turbidity is known to affect decontamination adversely. When the suspended solids settle down and the water seems clear, it is drained into another container leaving behind the settled solids. The clear water is poured manually as a stream from one's shoulder's height into another container kept on the ground and again water from the second container is poured back to the first container. This is repeated a few times to aerate the water manually. Finally, the water is filled in a container such as a clean drum or a bucket fitted with an outlet and valve, which is kept overhead at a convenient height. Water from the feed drum is led through a flexible plastic pipe well which is well covered with any weather resistant material and connected to the inlet of the solar water preheater coil which is shown in FIG. 10 of the present invention. The outlet of the solar water preheater coil is connected to the inlet, that is, one end of the perforated feed water tube (22) shown in FIG. 11. The other end of the feed water tube is closed with a plug. The mirrors are checked for their proper mounting on the solar disinfector unit, and then the unit is oriented such that the slant solar water pre-heater (5) as shown in FIG. 2 faces the sun during sunshine period. Proper solar orientation of the disinfector unit can be checked visually by noticing the symmetry of the shadows of left and right hand side booster mirrors which are cast on the ground under sunlight. The disinfector unit needs to be oriented towards the sun approximately once in an hour and slight disorientation does not degrade the performance of the unit because of the low concentration optical design of the disinfector. The grooved glass plate or board with attached feeder tube and collector channel is properly cleaned and set on the trolley frame sloping towards solar water preheater. Then, the valve of the feed water outlet is opened slowly such that water fills the solar water preheater and feed water tube, and then starts trickling down in parallel streams along the grooves and draining into the collector channel at the lower end. The temperature of the outlet water is monitored with a thermometer or any other temperature indicator and the feed water valve is set such that the temperature of the water draining from the output channel (20) in FIG. 11 exceeds 40 deg C. The product water is collected in a clean can and capped during storage to avoid exposure to air and light which may reactivate pathogens. When product is needed for use, the water is drawn through a bottom outlet with a valve

EXAMPLES

The following examples are given by way of illustration of the present invention and should not be construed to limit the scope of the present invention.

As examples of the use and performance of the present invention, the results of tests performed during December 2006-January 2007 at Bhavnagar, Gujarat, India using water from a lake which serves as a source for Bhavnagar municipal water treatment plant are tabulated below. The raw feed water was confirmed through chemical analysis and microbiological tests to be chemically fit, but to be biologically unfit for drinking as seen from the high values of the most probable number (MPN) in the tabulated results below.

The feed water was first treated with alum to settle the suspended matter which took about 45 minutes. After pouring the upper part of the clear water into another container, the bottom part of the water containing settled matter was removed for other rough uses like gardening. The clear water was aerated by pouring it a few times from about 1.5 meter height from container to container repeatedly and then filled into a feed water drum with an outlet and valve. The whole disinfector unit was oriented towards the sun approximately once in an hour and feed water side valve was so set as to let the feed water in the solar water preheater to be heated to different temperatures during experiments and trickle from the feed water tube in parallel streams over a grooved glass plate at different flow rates for experiments. The tests were conducted at noon during 11.00 am to 1.00 pm. The microbial quality of both alum treated feed water samples and solar treated product water samples of each experiment were tested in laboratory for the presence of different pathogens such as Heterotrophic bacteria, Coliform, Sulphite reducing anaerobes, *Pseudomonas aeruginosa*, Yeast-molds, *Salmonella shigella, Vibrio, S. fecalies* and the overall quality of the water as indicated by MPN were determined.

Example 1

The results of the Experiment with preheating but with very little aeration are tabulated below.

| Date | Sample | Flow rate ml/min | MPN Per 100 mL | Solar Insolation W/m² | Aeration (No of times poured from container to container) | Pre-heat temp (° C.) |
|---|---|---|---|---|---|---|
| Dec. 20, 2006 | Feed water alum-treated | | 1600 | | | |
| Dec. 20, 2006 | Feed water as above when solar-treated | 302 | 360 | 1100 | 10 | 38 |

These results show that with preheating but with less aeration, in the following example, the solar disinfection is only partially effective as indicated by the MPN reducing from 1600 to 360

Example 2

The results of the Experiment of Example 1 repeated with preheating but with increased aeration are tabulated below

| Date | Sample | Flow rate mL/min | MPN Per 100 mL | Solar Insolation W/m² | Aeration (No of times poured from container to container) | Pre-heat temp (° C.) |
|---|---|---|---|---|---|---|
| Jan. 9, 2007 | Feed water alum-treated | | 1600 | | | |
| Jan. 9, 2007 | Feed water as above when solar-treated | 370 | 2 | 940 | 20 | 37 |
| Jan. 10, 2007 | Feed water alum-treated | | 1600 | | | |
| Jan. 10, 2007 | Feed water as above when solar-treated | 330 | 3 | 940 | 20 | 40 |
| Jan. 11, 2007 | Feed water alum-treated | | 1600 | | | |
| Jan. 11, 2007 | Feed water as above when solar-treated | 340 | 3 | 1000 | 30 | 39 |

The results indicate that, clarification of feed water with alum, its adequate aeration appropriate for the volume of water to be treated and it's preheating to a temperature much below water pasteurization temperature of 62° C. and just above human body temperature of 37° C. disinfects drinking water to levels acceptable for drinking for which MPN should be equal to less than 3. The microbiological test results showed that pathogens such as Heterotrophic bacteria, Coliform, Sulphite reducing anaerobes, *Pseudomonas aeruginosa*, Yeast-molds, *Salmonella Shigella, Vibrio, S. fecalies* which were present in the raw feed water were absent in the solar treated water making it fit for drinking.

CONCLUSION

The above examples show that when the contaminated drinking water is clarified, aerated, treated, preheated to or above 37 deg C. and treated with exposure to the concentrated solar UV radiation using the present invention and following the procedure as mentioned above is disinfected satisfactorily as indicated by the low values of the MPN which is equal to or less than 3. The examples also show that the productivity of the invention can be at least 330 mL/min which is about 20 liter per hour when the solar radiation intensity on the horizontal plane is 940 W/m². Running the unit for 5 TO 6 hours can produce adequate amounts of drinking water for a small community of 50-100 people. During these initial experimental trial runs only about $\frac{1}{3}^{rd}$ of the multiple grooved plate was covered with thin stream of water due to a small misalignment during assembly of the device and which could not be set right immediately. With the proper alignment of this board, the productivity of concentrated solar disinfection can be further improved threefold for the same size of the device.

MAIN ADVANTAGES OF THE PRESENT INVENTION

1. It does not require any fuel or external conventional energy sources to operate.
2. It does not require conversion of solar energy into electricity
3. It intensifies naturally available ultraviolet part of the solar radiation for disinfecting to improve the production rate of drinking water.
4. It allows direct exposure of streaming water to solar ultraviolet radiation for more efficient disinfection without an intervening plastic or glass material of the container bottle or a coil which may transmit ultraviolet radiation less efficiently to the water.
5. It does not require raw water to be heated to a high temperature as needed for pasteurization, which may cause scaling, if the feed water happens to be hard.
6. It enhances the effectiveness of disinfection of drinking water by its aeration and preheating and intensification of ultraviolet radiation by concentrating solar radiation using mirrors.
7. Because of low concentration optical design of the solar disinfector, the disinfector unit does not require continuous tracking of the sun but only intermittent manual orientation towards the sun, say, once in an hour and slight disorientation does not degrade the performance of the unit.
8. Solar orientation of the disinfector can be checked easily by noticing the symmetry and equal sizes of the shadows of left and right side booster mirrors cast on the ground by sunlight.
9. It can produce larger volume rates of disinfected drinking water as it disinfects a continuous stream of water unlike known batch processes using water placed in transparent plastic bottles and exposed to normal solar radiation for producing drinking water.

We claim:

1. A manually operated continuous flow drinking water disinfector assembly using solar radiation comprising:
   i. a slant solar pre-heating chamber (6) with side and bottom thermal insulation;
   ii. a water heating coil being placed inside the slant solar pre-heating chamber (6), said water heating coil being covered by a doubly hinged and doubly glazed window;
   iii. a skirt (18) nailed or screwed onto a frame of the doubly hinged and doubly glazed window;
   iv. a fiber reinforced board or glass plate with multiple parallel etched grooves (19) attached adjacent the skirt as a disinfector section (4) for flow of a water stream;
   v. a perforated feed water tube (22) being present above a top end of the said fiber reinforced board or glass plate;
   vi. an output channel (20) adjacent the slant solar preheating chamber (6) made of an aluminum angle (20), the output channel (20) being provided at a lower end of said glass plate or board, to collect disinfected drinking water;
   vii. at least two inclined mirrors fixed on left and right sides of said slant solar preheating chamber (6), which are for reflecting solar radiation onto the slant water pre-heater (6); and
   viii. at least two inclined mirrors on left and right sides of the water stream flow in the disinfector section (4) and one inclined mirror with a prop (7) at the feed water tube side (22), all of which are for reflecting solar radiation onto the grooved plate or board.

2. A continuous flow drinking water disinfector assembly as claimed in claim 1, wherein the disinfector assembly is mounted on a trolley (2) with four swiveling cast iron wheels for orienting the disinfector assembly manually towards the sun.

3. A continuous flow drinking water disinfector assembly as claimed in claim 1, wherein at least two inclined mirrors (1) are fitted on left and right sides of said slant solar preheating chamber (6) at an angle of 60° as measured from a plane of the doubly glazed window of the preheater, wherein the mirrors are either float glass mirrors having silver coating or aluminum deposit on their rear side as reflective film or polished and protective coated aluminum mirrors.

4. A continuous flow drinking water disinfector assembly as claimed in claim 1, wherein at least two inclined mirrors are fitted on left and right sides of the water stream flow in the disinfector section at an angle of 60° as measured from the plane of said grooved plate or board, wherein the mirrors are either float glass mirrors having silver coating or aluminum deposit on their rear side as reflective film or polished and protective coated aluminum mirrors.

5. A continuous flow drinking water disinfector assembly as claimed in claim 1, wherein the slant solar preheating chamber (6) has an inner lining of black painted aluminum or galvanized iron sheet.

6. A continuous flow drinking water disinfector assembly as claimed in claim 1, wherein edges of doubly hinged and doubly glazed window are lined with stitched thick cotton fabric tape (17) serving as air seals to retain hot air inside.

7. A continuous flow drinking water disinfector assembly as claimed in claim 1, wherein the skirt (18), nailed or screwed onto the frame, is made of a tape of stitched thick cotton fabric which serves as a secondary air seal for hot air generated in the slant solar pre-heating chamber (6).

8. A continuous flow drinking water disinfector assembly as claimed in claim 1, wherein the fiber reinforced board or glass plate with multiple parallel etched grooves (19) is sloping towards a pre-heater side of the assembly to facilitate flow of feed water as a stream for intensified solar UV exposure for disinfection.

9. A continuous flow drinking water disinfector assembly as claimed in claim 1, wherein one mirror on a feeder tube (22) side is placed with a prop (7) so that its inclination can be varied to suit an inclination of the sun at different times of the day.

\* \* \* \* \*